United States Patent

[11] 3,612,114

[72] Inventor James A. Pawloski
box 158, Woodstock, Conn. 06281
[21] Appl. No. 818,754
[22] Filed Apr. 23, 1969
[45] Patented Oct. 12, 1971

[54] WIRE CUTTING AND BENDING TOOL
5 Claims, 6 Drawing Figs.

[52] U.S. Cl. .................................................. 140/106,
29/243.5, 72/331, 140/123
[51] Int. Cl. .................................................. B21f 15/00
[50] Field of Search .................................................. 140/106,
111, 117, 123; 29/243.5, 243.57, 513; 72/326,
331; 7/14.1

[56] References Cited
UNITED STATES PATENTS

| | | | |
|---|---|---|---|
| 3,034,382 | 5/1962 | Hazel | 72/331 |
| 3,141,492 | 7/1964 | Petree et al. | 72/326 |
| 3,414,024 | 12/1968 | Anderson et al. | 72/326 |

*Primary Examiner*—Lowell A. Larson
*Attorney*—Arthur T. Fattibene

ABSTRACT: This disclosure is directed to a power tool for cutting and bending or laying over wire, and the tool is particularly adapted for use in the manufacture of printed circuits or circuits boards. The tool comprises a housing having a fluid-actuated piston to which a cutting quill is mounted for movement relative to a quill guide extending forwardly of the housing. The tip end of the quill guide is provided with a notch for receiving a wire to be cut transversely to the movement of the quill. The improvement resides in the specific construction of the tip end of the quill which greatly improves and enchances the cutting and layingover action of the tool.

PATENTED OCT 1 2 1971 3,612,114

INVENTOR
JAMES A PAWLOSKI
BY
Arthur T. Fattibene
ATTORNEY

WIRE CUTTING AND BENDING TOOL

PROBLEM

In the manufacture of circuit boards and/or printed circuits the leads of the circuit components, e.g., resistors, capacitors, transistors and the like, are required to be trimmed. Usually such circuit boards or printed circuits are provided with a number of holes through which the leads of the various components are extended prior to soldering. To provide for a more positive mechanical and electrical connection, it was customary to extend the leads slightly beyond the surface of the circuit board so that the extended ends could then be bent into a plane parallel and contiguous to the surface of the circuit board before soldering.

Such cutting and bending of the wire leads have been performed with fluid-actuated cutters. However it has been noted that considerable experience was required on the part of the operator to achieve a satisfactory cut-and-bend operation. Also, it was necessary for the operator to specifically position a tool in a particular relationship with respect to the wire to be cut in order to prevent the cutting tool from pushing the lead back out of the hole. Also it was necessary for the operator to apply some pressure on the tool in order to attain a satisfactory cut-and-bend operation. Unless the tool was properly positioned relative to the wire to be cut and/or bent, the length of layover could vary over a relatively considerable range.

OBJECTS

It is therefore an object of this invention to provide a fluid-actuated cut-and-bend tool with an improved cutting tip that will insure accurate and uniform cutting and layover of the wire leads each time the tool is operated.

Another object is to provide a cut-and-bend tool with an improved cutting quill which renders the cutting and layover operation virtually foolproof and consistent.

Another object is to provide an improved cut-and-bend tool which can be satisfactorily handled by operators having little or no experience with the operation thereof.

Another object is to provide a cut-and-bend tool with an improved cutting tip capable of uniformly cutting and bending a wire lead regardless of the position the tool is held relative to the wire lead or workpiece.

BRIEF SUMMARY OF THE INVENTION

The foregoing objects and other features and advantages are attained by a wirecutting and layover tool comprising a housing formed with a piston chamber and having a piston mounted in the chamber for movement between an operative and inoperative position. Connected to the piston means is a cutting quill mounted for movement relative to a quill guide connected to the front of the housing when the piston is operated. A spring is operatively associated with the piston means to normally bias the piston means and connected cutting quill toward its respective inoperative position. Valve means are provided for controlling the flow of activating fluid to the piston chamber.

The quill guide is provided with a notch disposed in advance of the retracted cutting quill so as to accommodate the wire to be cut and bent normal to the direction of movement of the quill. To provide for accurate and positive layover of the wire upon each cutting operation the tip end of the quill is provided with a pair of angularly disposed facets or surfaces.

FEATURES

A feature of this invention resides in the provision of an improved cut-and-bend tool having a cutting quill constructed so as to insure accurate and positive cutting and layover of wire on each cutting operation.

Another feature resides in an improved tip construction for a cut-and-bend tool in which the accurate cutting and bending of a wire can be performed regardless of the position of the wire relative to the receiving notch of the quill guide.

Another feature resides in the provision wherein the tool may function as a lead bender in those instances when leads of predetermined lengths are used which do not require trimming by cutting.

Another feature resides in the provision of an improved cutting tip for a cutting quill for enabling accurate and positive cutting and bending of wire leads without the need of applying a force on the tool.

Other features and advantages will become more readily apparent when considered in view of the drawings in which.

Figures 1, 2, 5, 6:
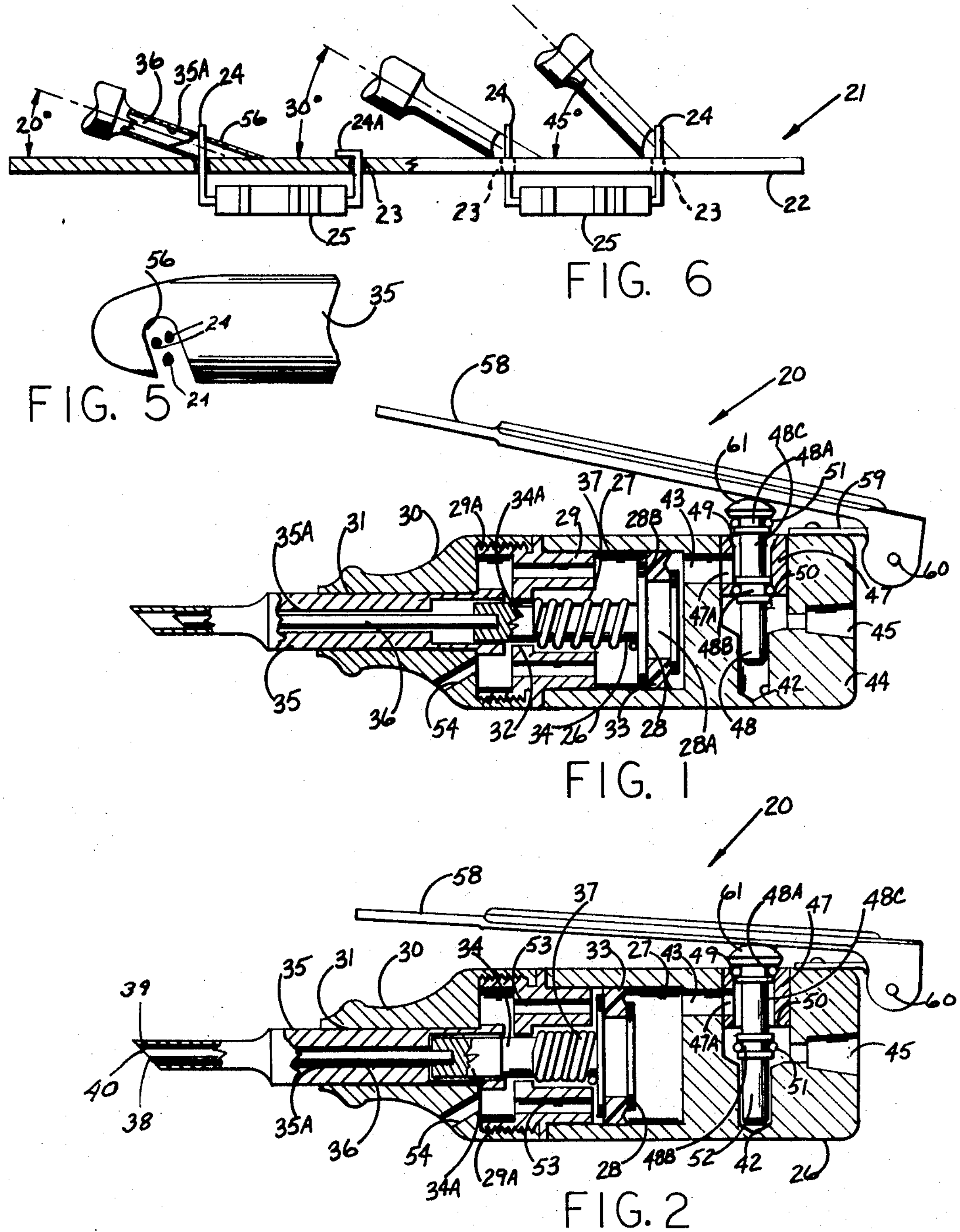
FIG. 1 illustrates a sectional view of a cut-and-bend tool embodying the present invention with the parts illustrated in the inoperative or retracted position.
FIG. 2 is a view similar to that of FIG. 1 but showing the parts in the operative position.
FIG. 5 is an enlarged plan view of the tip end of the quill guide illustrating the relative position which the wire leads may assume during a cutting and bending operation.
FIG. 6 illustrates a side view of a circuit board showing the manner in which the leads of the electronic component are cut and bent by the tool.

In the drawings there is shown an embodiment of a cut-and-bend tool 20 particularly adapted for use in the manufacture of circuit boards or printed circuits 21. Referring to FIG. 6 a circuit board 21 generally comprises a rigid backing member 22 on which there is printed a suitable circuit. The backing member 22 is also provided with a plurality of holes 23 which extend through the portions of the printed circuit. The holes 23 are arranged to accommodate the leads 24 of various component elements 25, such as resistors, transistors, capacitors and the like. The various circuit components 25 are connected in electrical contact with the printed circuit by extending the leads 24 through an appropriate hole or opening 23, and securing them to the printed circuit by soldering. The excessive lead lengths may then be cut and trimmed.

With the cut-and-bend tool 20 of this invention the electrical bond or connection of the leads 24 to the printed portion of the circuit can be mechanically enhanced by bending the trimmed leads 24A to a position parallel to the board as shown in FIG. 6. The leads so bent thereby increase the mechanical strength of the connection to the board.

The tool 20 for effecting the trimming, cutting and bending of leads 24 prior to soldering comprises a housing 26 having a chamber 27 in which a piston means 28 is reciprocally mounted. An end cap 29 having a central opening is fitted to the open end of the piston chamber 27. One end of the cap 29 is snugly received within the chamber 27 and it is suitably secured to the housing 26 as by a pin connection. The other end is provided with a threaded connection 29A by which the pin housing or tip end 30 may be detachably secured.

The pin housing or tip end 30 is provided with a longitudinally extending bore 31 disposed in axial alignment with the central opening 32 of the end cap 29.

The piston means 28 reciprocally mounted for movement within the piston chamber 27 comprises a piston head 28A which is formed with angular groove 28B in which there is fitted a sealing ring or piston cup 33 formed of suitable resilient material, as for example, rubber or neoprene or the like. The outer periphery of the piston cup or seal 33 forms a bearing against the internal surface of the chamber 27 to form a seal against the loss of fluid pressure when the piston 28 is actuated. A piston stem 34 is connected to the piston head 28A so as to extend forwardly thereof. The forward end of the piston stem 34 is provided with opposed flats 34A adapted to be received in the bifurcated end portion of a quill guide 35 that extends through and forwardly of the pin housing 30.

A cutting quill 36 is connected to the piston stem 34, the quill extending through the central bore 35A of the quill guide 35. A spring means 37 in the form of a coil spring circumscribes the piston stem 34 and is disposed in bearing relationship between the end cap 29 and the piston head 28A in a manner so that this spring normally biases the piston head 28A toward an inoperative position or toward the right as viewed in FIG. 1.

Figure 4:
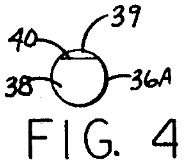
FIG. 4 is a front view of the tip end of the cutting quill of FIG. 3.
Figure 3:
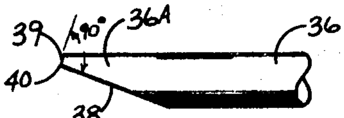
FIG. 3 is an enlarged side elevation detail of the cutting quill tip.

The quill 36 is thus mounted within the bore 35A of the quill guide 35 for limited relative movement with respect thereto. As best seen in FIGS. 3 and 4 the tip or cutting end 36A of the quill 36 is provided with a pair of angularly disposed flat surfaces or facets 38, 39 to define a cutting edge 40. The flat surface 38 defines the angle at which the tool 20 is to be presented to the wire or lead 24 to be cut, and the other flat surface 39 is inclined at an angle relative thereto to define a cutting edge 40 intermediate the width or thickness of the quill 36. As seen in FIG. 3 the respective flat surfaces 38, 39 are angularly disposed to define an included angle substantially equal to 90°. With the cutting tip defined, the cutting edge 40 is interposed intermediate the height of the cutting quill as best seen in FIG. 4.

Referring to FIGS. 1 and 2 a bore or valve chamber 41 extends into the rear end portion of the housing 26 in a direction substantially transversely thereof. Formed in the bottom wall of the valving chamber 41 is a guide well or recess 42. The valving chamber 41 is connected in communication with the piston chamber 27 by means of a longitudinally extending passageway 43.

In the end wall 44 of the power end portion of the housing 26 is an opening 45 defining a fluid inlet which communicates with the interior of the valving chamber. The inlet is formed so as to provide for a quick disconnect coupling with a conduit or hose (not shown) for supplying the actuating fluid to the valving chamber 41. Accordingly the hose (not shown) is connected to a source of fluid supply, as for example, compressed air or the like.

A valve body 47 in the form of an angular sleeve is secured within the valving chamber 41. The valving sleeve or body 47 is provided with an outlet 47A disposed in communication with the passageway 43 leading to the piston chamber 27. The arrangement is such that one end 47B of the valve body or sleeve 47 is disposed substantially coincident with the plane surface of the housing 26. Each end of the valve body or sleeve 47 is formed with a valve seat 49, 50 for receiving a valving member 48, and the respective valve seats 49, 50 are disposed on either side of the fluid outlet 47A.

The valve member 48 is formed as a spool-type valve having spaced valve heads 48A, 48B interconnected by a spool stem 48C. Each valve head 48A, 48B is formed with an angular groove in which a resilient sealing or O-ring 51 is seated. The spool stem 48C is of sufficient length so that the valve member 48 is free to reciprocate within the valve body 47 to valve either one or the other of the valve seats 49, 50. An extension 52 connected to one end of the valve spool 48 is received in the well or recess 42 for guiding the movement of the spool valve 48. The lower valve head 48B and the sealing ring 51 secured thereto is arranged so that it is at all times disposed above the center line of fluid inlet 45, and that its limit of movement is confined between the centerline of the inlet 45 and the bottom valve seat 50 of the valve body or sleeve 47.

The end cap 29 is provided with a plurality of longitudinally extending bores to form passageways 53 for venting the piston chamber 27 to the tip or pin housing 30, the latter in turn being provided with a vent opening 54 which exhausts to the atmosphere.

In operation, the air or fluid in chamber 27 being displaced by piston 28 as it moves from the normal inoperative position of FIG. 1, to an operative position of FIG. 2, will exhaust through the longitudinal passageways 53 of the end cap 29, and vent through opening 54 the pin housing 30 to the atmosphere. On the return stroke of the piston 28 under the action of spring 37, the air or fluid being displaced in chamber 27 is exhausted out through passageway 43 and the open seat 40 of the valve sleeve 47.

As best seen in FIG. 5, the quill guide 35 is provided with a notch 56 which opens to one side, which notch extends transversely of the bore 35A extending through the quill guide 35. The arrangement is such that when the quill guide 35 is presented to the lead 24 to be cut and bent, the lead that extends beyond the circuit board 22 is received in notch 56 transversely to the path of movement of the cutting quill 36. The movement of the quill 36 toward the tip end of the quill guide 35 causes the cutting edge 40 of the quill 36 to sever the extended length of the lead, and at the same time due to the inclination of the cutting tip 36A, the lead 24 is both cut and laid over to a position parallel to the circuit board as seen in FIG. 6. Since the tip end 36A of the quill 36 is defined by angular disposed faces or facets 38, 39 to define a sharp cutting edge 40, it has been discovered that accurate and positive laying over of the lead 24 is attained regardless of the position in which the lead 24 is hooked into the notch 56. Prior experience had indicated that unless the lead 24 was properly positioned within the notch so that the lagging or rear edge of the notch was firmly pressed against the lead, the cutting quill would tend to push the lead out through the hole, thereby preventing a proper cutting and bending action. With the specific tip end construction 36A, as herein defined, experience has shown that regardless of the position of the lead 24 within the notch 56 of the quill guide, the cutting edge 40 of the quill insures a positive cutting and bending operation. With the cutting tip 36A of this invention, it is no longer required that the operator particularly locate the lead 24 with respect to the notch 56 since a proper cutting and bending operation will be achieved regardless of the relative position of the lead within the notch of the cutting quill. Thus, with a lead 24 disposed within the notch in any of the positions shown in FIG. 5, a positive cut-and-bend action is assured. Also with the described cutting tip substantially equal lengths of layover are achieved on each operation. Consequently the tool herein described can be utilized to effectively cut and bend leads without requiring the operator to apply the pressure of the cutting tool against the lead during the cutting and bending operation.

The angle in which the tip end of the quill 36 is truncated with respect to a horizontal reference plane determines the angle at which the tool is positioned relative to the circuit board. For example, the guide 35 and quill 36 may be truncated at angles of 20°, 30° or 45° as seen in FIG. 6.

An actuator in the form of a treadle lever 58 is connected to the housing 26 for effecting the actuation of the tool. A lever mount 59 is suitably secured to the end of the housing by a suitable fastener and the lever 58 is pivotally connected at 60 to the extended end of the lever mount 59. The arrangement is such that the treadle lever 58 extends forwardly of the housing to engage with the head end 61 of the valving member 48 which normally extends beyond the housing 26 when the tool is connected to a source of fluid pressure. See FIG. 1. Thus, to effect operation of the tool, the treadle lever 58 is depressed and released.

With the construction described the operation of the tool is as follows. With the inlet 45 of the tool 20 connected to a source of fluid pressure, such as compressed air, the force of the fluid pressure flowing through the inlet will normally tend to displace the valve member 48 upwardly as viewed in FIG. 1. In doing so, the lower valve head 48B is disposed in sealing position against the valve seat 50. In this position the head 61 of the valve member 48 extends beyond the housing 26 as noted in FIG. 1. Because the lower seat 50 is valve-closed and is maintained closed because of the fluid pressure acting thereon, the force of spring 37 acting on the piston 28 tends to maintain the piston head 28A and the connected cutting quill 36 toward a retracted position as noted in FIG. 1. When the treadle lever 58 is actuated, the head 61 of the valving member 48 is displaced into the valve body 47 causing the lower valve seat 50 to be valved open, and the upper valve seat 49 to be valved closed. In doing so the activating fluid is directed through the lower valve seat 50 into the valve body 47 and out through the outlet 47A and aligned passageway 43 into the piston chamber 27, thereby exerting a fluid pressure on the right side of piston 28, thereby displacing the piston to the left as viewed in FIG. 2. In so doing, the air being displaced on the other side of the piston 28 is exhausted to atmosphere through passageway 53 and vent opening 54 in the housing tip 30. Displacement of the piston 28 to the left causes the quill 36 to be moved relative to the quill guide 35, the force thereof being sufficient to cut and bend any wire lead 24 disposed within the notch 56 in the tip end of the guide 35. So long as the treadle lever 50 is maintained depressed the fluid pressure acting on the piston 28 maintains the connected quill 36 in the extended position.

As the force on the treadle lever 58 is removed, the release of the lever 58 will cause the fluid pressure to lift the valve member 48 into sealing position against the lower valve seat 50 thereby shutting off the flow of fluid pressure to the piston chamber 27. The bias or tension exerted by the spring 37 acting on the piston head 28 will then restore the piston 28 and the connected quill 36 to its normal inoperative retracted position. See FIG. 2. In doing so the air displaced between the piston head 28A and the end wall of the piston chamber 27 is exhausted or vented to atmosphere through passage 43 opening 47A and out through the upper open valve seat 49.

Because of the specific construction at the cutting tip of the quill 36, a positive cutting and bending operation is assured each time the tool is activated. The arrangement is such that the cutting action is effected without the tendency of the quill 36 to push the wire lead 24 back out through the opening, in the circuit board 22.

While the instant invention has been described with respect to a particular embodiment thereof it will be readily understood and appreciated that variations and modifications may be made without departing from the spirit or scope of the invention.

It will be further understood that the described tool may be effectively used to bend the leads only when leads of predetermined lengths are used which do not require trimming, that is, when the lead does not extend beyond the upper edge of notch 56 as seen in FIG. 6, but terminates within the bore of quill guide 35.

I claim:

1. A wirecutting and layover tool comprising:
a housing,
a quill guide connected to said housing,
said quill guide having a bore extending therethrough,
a piston means reciprocally mounted in said housing for movement between an operative and inoperative position,
said piston including a cutting quill reciprocally mounted within the bore of said quill guide,
a notch formed adjacent the tip end of said quill guide,
said notch opening to one side of said quill guide and disposed to extend transversely of the bore of said quill guide,
and said cutting quill including a cutting tip defined by a pair of angularly disposed flat surfaces to define a pointed cutting edge at the leading end of said quill, and which edge is located intermediate the width of said quill.

2. The invention as defined in claim 1 wherein one of said flat surfaces defines the angle at which the tool is presented to the wire to be cut and the other flat surface is inclined at an angle relative to said first-mentioned flat surface to define a leading cutting edge intermediate the width of said quill.

3. The invention as defined in claim 2 wherein said flat surfaces defining said cutting edge are disposed at an angle of substantially 90°.

4. A wirecutting and layover tool comprising:
a housing,
a piston means reciprocally mounted in said housing for movement between operative and inoperative positions,
a guide projecting outwardly from said housing,
said guide having a bore extending therethrough,
said guide having a tapered side adjacent the tip end thereof for defining an angle at which said tool is adapted to be presented to a wire to be cut,
a cutting quill extending in the bore of said guide, said quill being operatively connected to said piston means for reciprocation between operative and inoperative position,
a spring means acting on said piston means and connected quill for normally biasing said piston means and connected quill toward inoperative positions,
valve means disposed in said housing for controlling the introduction and exhaust of an actuating fluid to one side of said piston means,
means defining a notch adjacent the tip end of said guide, said notch opening to one side of said guide,
and said notch being normally disposed in advance of said quill when in the inoperative position,
said quill having a lower tapering surface corresponding substantially to the tapered side of said guide,
said quill tapered surface intersecting the tip end intermediate the width thereof,
and said tip including an upwardly rearwardly inclined tapered surface disposed at an angle to said lower tapered surface whereby a cutting edge is defined at the junction of said tapered surfaces.

5. The invention as defined in claim 4 wherein the included angle between said surfaces is substantially 90°.